(12) United States Patent
Rose

(10) Patent No.: X3353
(45) Date of Patent: Aug. 6, 1821

(54) TRUCKS,GUN, CUTTING

(76) Inventor: Robert Rose

The United States of America.

TO ALL TO WHOM THESE Letters Patent SHALL COME

Whereas [illegible] Robert [illegible]

the United States, hath alleged that he has invented a new and useful improvement

[illegible]

which improvement he states has not been known or used before his application; hath [illegible] that he does verily believe that he is the true inventor or discoverer of the said improvement; hath paid into the treasury of the United States the sum of thirty dollars, delivered a receipt for the same, and presented a petition to the Secretary of State, signifying a desire of obtaining an exclusive property in the said improvement, and praying that a patent may be granted for that purpose: These are therefore to grant, according to law, to the said [illegible] his heirs, administrators or assigns, for the term of fourteen years, from the [illegible] day of [illegible] one thousand eight hundred and [illegible] the full and exclusive right and liberty of making, constructing, using and vending to others to be used, the said improvement; a description whereof is given in the words of the said [illegible] himself, in the schedule hereto annexed, and is made a part of these presents.

In Testimony whereof, I have caused these Letters to be made Patent, and the Seal of the United States to be hereunto affixed.

GIVEN under my hand, at the City of Washington, this [illegible] day of [illegible] in the year of our Lord one thousand eight hundred and [illegible] and of the independence of the United States of America the forty [illegible]

[illegible] Monroe

BY THE PRESIDENT

John Quincy Adams

Secretary of State.

[illegible] Washington, To Wit

I DO HEREBY CERTIFY, That the foregoing Letters Patent were delivered to me on the [illegible] day of [illegible] in the year of our Lord one thousand eight hundred and [illegible] to be examined; that I have examined the same, and find them conformable to law; and I do hereby return the same to the Secretary of State, within fifteen days from the date aforesaid, to wit: on this [illegible] day of [illegible] in the year aforesaid.

[illegible]

Attorney General of the United States.

The Schedule referred to in these Letters Patent
and making part of the same, containing a description in the words of
the said Robert Rose himself of his improvement in the machine for cutting
Trucks for gun carriages and for other purposes

---

This machine may be made of brass or any other kind
of metal, and is formed in the following described manner
Two circles or hoops of metal, of adequate thickness, and
from twenty one inches diameter, to any other size, either more or less,
according to the dimensions of the truck required, form the outward
sides of the machine. The two [illegible] are fixed opposite to each other,
about nine inches apart, by four horizontal bars of the same metal,
and equidistantly placed all of which are cast together and form one piece
being the outward part of the machine.
On the four horizontal bars are fixed the bits that perform
the operation of [illegible]; [illegible] bits are formed with a slit similar to some
plane irons, so as to be regulated at pleasure by screws. [illegible]
of said bits cut horizontally the cutting part appearing through [illegible]
[illegible] on the outside surface of the metal circle that forms the [illegible]
of the machine
In the centre of the above described circles is fixed the
centre part of the machine, which is also made of metal, and in
appearance like an open cylinder, having a [illegible] at the top of
about six inches in diameter, or any other size that may be required.
Said centre part in depth is precisely the same as the outward
part of the machine, and has the same number of [illegible] fixed [illegible]
[illegible] the outward circle. The said centre part is [illegible] separately from
the outward part, and serves to cut the centre of the truck that
receives the axle tree of the carriage.
The above described castings are fixed by [illegible] on four arms
of [illegible] wheel [illegible] having a long female screw in the centre
for

United States Patent

Patent No.: X3353 for the purpose of [illegible] the machine to a mandrel similar to a turner's lathe. This machine can be put in motion, either by steam or animal power.

Robert Reid

Witnesses

Wm Elliot

Robert Kynoch